United States Patent
Kilworth et al.

(10) Patent No.: US 6,990,400 B2
(45) Date of Patent: Jan. 24, 2006

(54) LOAD ANTICIPATING ENGINE/TRANSMISSION CONTROL SYSTEM

(75) Inventors: Timothy Joel Kilworth, Waverly, IA (US); David James Boege, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/075,501

(22) Filed: Mar. 9, 2005

(65) Prior Publication Data

US 2005/0149245 A1 Jul. 7, 2005

Related U.S. Application Data

(62) Division of application No. 10/457,223, filed on Jun. 9, 2003.

(51) Int. Cl.
*G06F 17/00* (2006.01)
*F02D 41/02* (2006.01)

(52) U.S. Cl. ............................ 701/54; 701/55; 701/65; 701/95; 123/339.21

(58) Field of Classification Search ................ 701/54, 701/55, 61, 65, 84, 87, 90, 95, 97, 101, 115; 477/32, 156; 123/339.21, 406.64, 406.65; 60/431, 433, 434
See application file for complete search history.

(56) References Cited

U.S. PATENT DOCUMENTS

| 5,778,329 | A | 7/1998 | Officer et al. ................. 701/55 |
| 6,211,471 | B1 * | 4/2001 | Rocke et al. ............... 177/136 |
| 6,385,519 | B2 * | 5/2002 | Rocke ......................... 701/50 |
| 6,542,789 | B2 * | 4/2003 | Ufheil ....................... 700/275 |

OTHER PUBLICATIONS

Patent Abstracts of Japan, vol. 1997, No. 10, Oct. 31, 1997 & JP 9 163814A (Ishikawajima Shibaura Mach Co Ltd); Yanmar Agricult Equip Co Ltd; Yanma), Jun. 24, 1997.

* cited by examiner

*Primary Examiner*—Tan Q. Nguyen

(57) ABSTRACT

An engine and transmission control system is responsive to manipulation of manually operated control devices which can cause actions which result in increased load on the vehicle engine, before the engine actually begins to be effected by the load increase. The control system monitors manipulation of control devices and engine load, and when engine load decreases, the system stores the identity and displacement direction of the manipulated control device. When the same control device is then manipulated in the opposite direction, the control system will begin to temporarily boost or raise engine rpm and decrease the transmission ratio in anticipation of the expected load. After the control system has boosted the engine rpm, it monitors whether or not the engine speed was boosted high enough to prevent the engine speed from dropping below a threshold. If the engine speed drops below the threshold, then the control system will increase the amount of engine speed boost to be applied the next time that control device is manipulated.

4 Claims, 6 Drawing Sheets

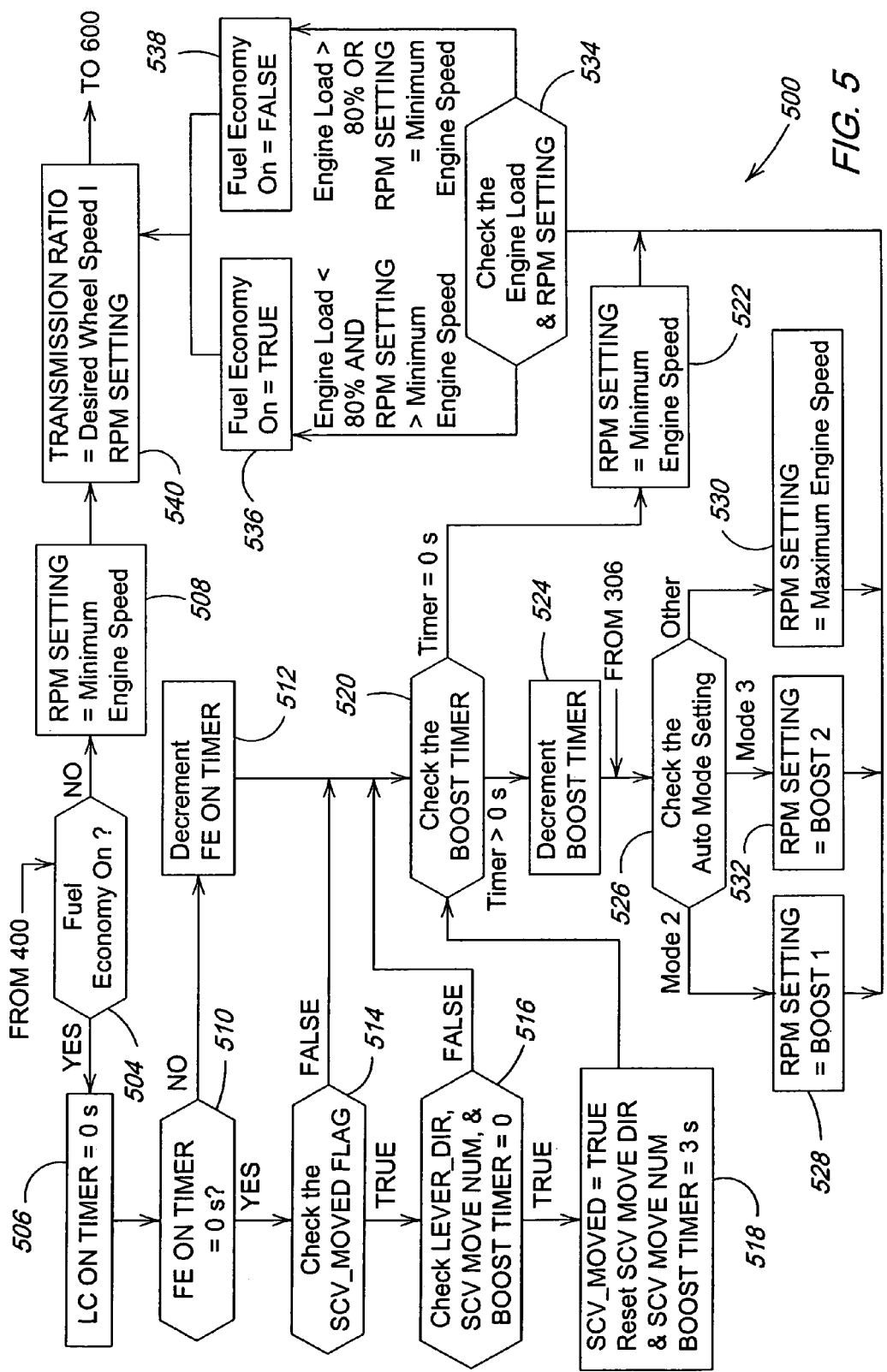

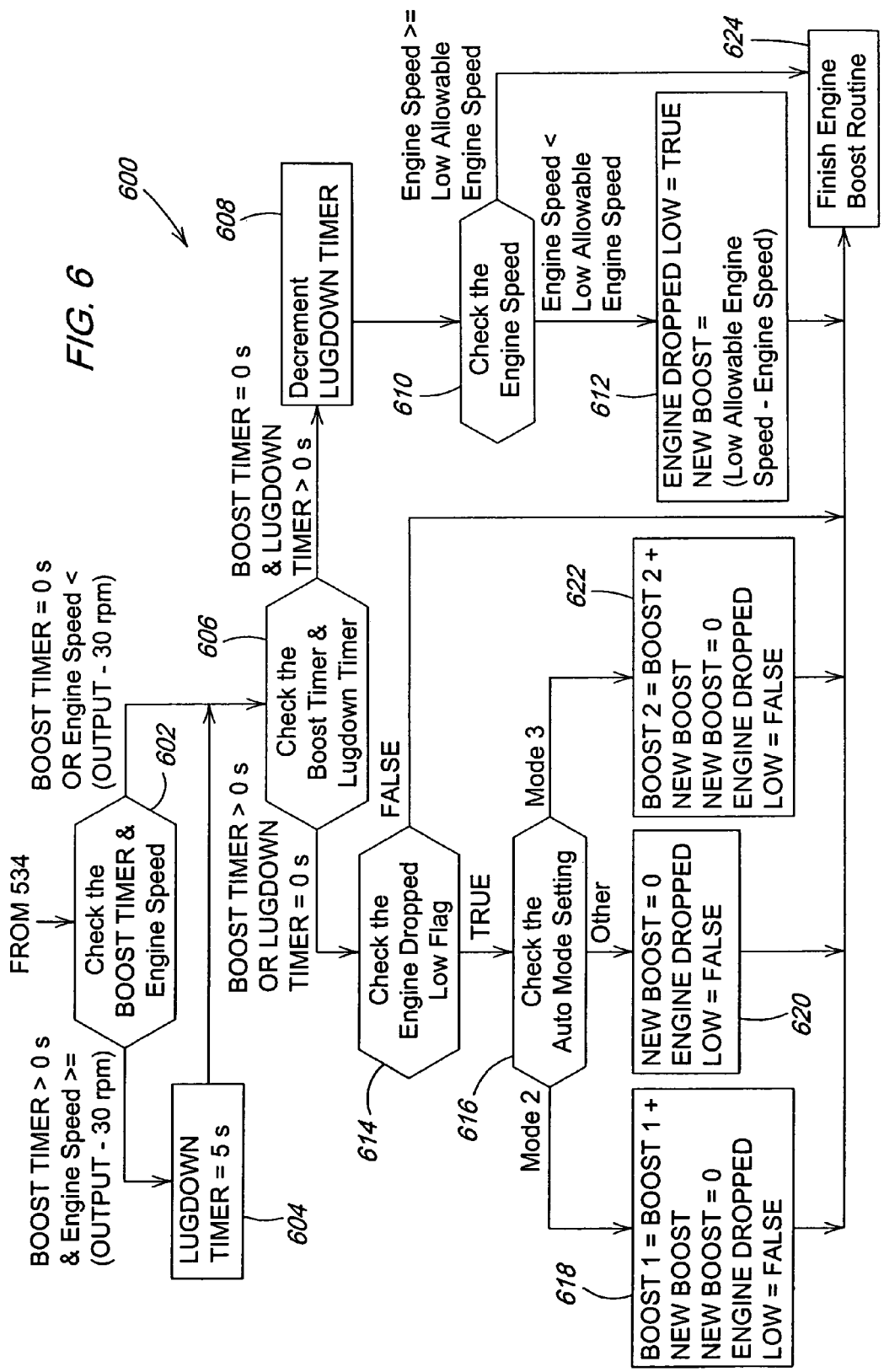

LOAD ANTICIPATING ENGINE/TRANSMISSION CONTROL SYSTEM

CROSS-REFERENCE TO RELATED APPLICATION

This application is a division of applicant's co-pending application U.S. Ser. No. 10/457,223, filed 9 Jun. 2003 and titled LOAD ANTICIPATING ENGINE/TRANSMISSION CONTROL SYSTEM, which application is pending.

BACKGROUND

The present invention relates to an electronic engine and transmission control system which is responsive to manipulation of manually operated control devices which can cause actions which result in increased load on the vehicle engine.

There are production agricultural tractors which have an electronically controlled engine and electronically controlled transmission, such as an infinitely variable transmission (IVT). Such a tractor can be operated in a fuel economy mode wherein the engine is controlled to run at a low engine speed. If, while in this mode, the operator manually commands the hitch to drop a hitch-mounted implement into the ground, or if the operator commands the ground-engaging elements of a towed implement, such as a ripper, to engage the earth, the tractor may stall because the transmission and engine cannot react quickly enough to overcome the increase in load. This can happen when such a tractor is being turned around at the end of a field and then driven a short distance at the end of the row. Then when the tractor is driven back into the field and the implement is dropped into the ground, the tractor may stall because the engine speed is too low.

SUMMARY

Accordingly, an object of this invention is to provide a system which prevents engine stalling as a result of the performance of manually controlled operations which increase the load on the engine.

A further object of the invention is to provide such a system which automatically boosts engine speed for a short time period in response to manipulation of an implement control device before operation of the implement increases the load on the engine.

These and other objects are achieved by the present invention, wherein an engine and transmission control system is provided for a vehicle/implement system having manually operated control devices which are used to control hitch-mounted and/or towed implement operations. The control system monitors manipulation of the control devices and engine load, and when engine load decreases, the system stores the identity and displacement direction of the manipulated control device. When the same control device is then manipulated in the opposite direction, the control system will temporarily boost or raise engine RPM and decrease the transmission ratio in anticipation of the expected load. After the control system has boosted the engine rpm, it monitors whether or not the engine speed was boosted high enough to prevent the engine speed from dropping below a threshold. If the engine speed drops below the threshold, then the control system will increase the amount of engine speed boost to be applied the next time that control device is manipulated.

BRIEF DESCRIPTION OF THE DRAWINGS

FIG. 5 is a logic flow diagram of light load calculation subroutine portion of FIG. 2; and FIG. 6 is a logic flow diagram of the boost calculation subroutine portion of FIG. 2.

DETAILED DESCRIPTION

Figure 1:
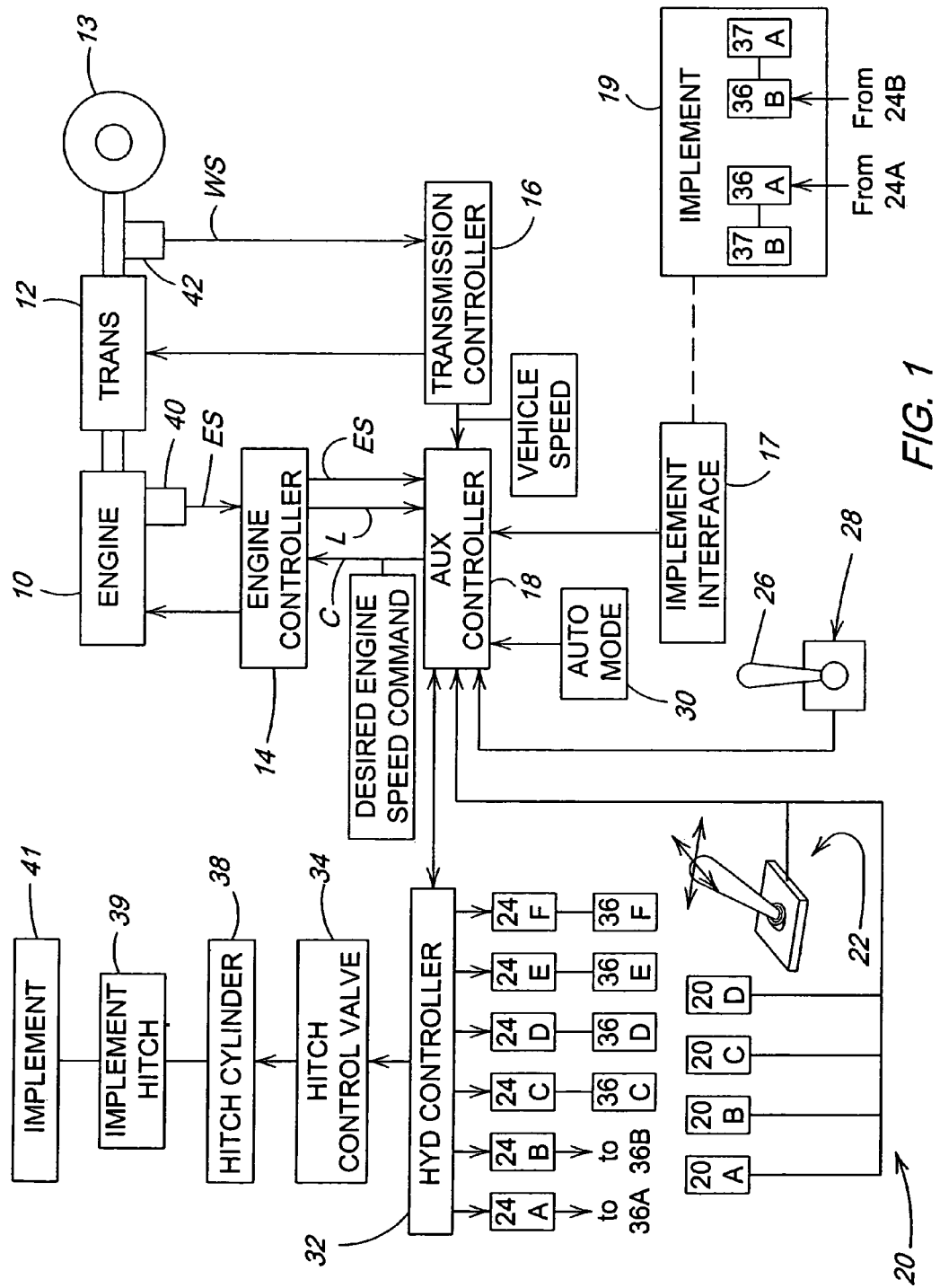
FIG. 1 is a simplified schematic diagram of an engine control system according to the present invention.

Referring to FIG. 1, an engine 10 drives a transmission 12, preferably an infinitely variable transmission (IVT) which drives a vehicle wheel 13. The engine 10 is controlled by an electronic engine controller 14, and the transmission 12 is controlled by an electronic transmission controller 16. Controllers 14 and 16 are communicated with an auxiliary controller 18 via a conventional CAN bus. Controller 18 may be mounted in a vehicle armrest (not shown). An implement interface unit 17 communicates hydraulic valve command signals from an implement 19, such as a towed implement, to controller 18.

Controller 18 receives command signals from a plurality of operator manipulated input or function control devices 20A–20D, such as paddle pots or selective control valve (SCV) levers for controlling (via hydraulic controller 32) selective control valves (SCV) 24A–24D, and a joystick 22 for controlling selective control valves 24E and 24F, and a conventional hitch control lever 26 and lever position sensor 28 for controlling a hitch control valve 34. SCVs 24A and 24B may control hydraulic cylinders 36A and 36B located on the implement 19. Hydraulic cylinders 36A and 36B control ground engaging elements 37A and 37B on the implement 19. SCVs 24C–24F may control other hydraulic cylinders 36C–36F. Controller 18 also receives signals from an auto mode switch 30, and hydraulic valve commands via interface 17 from control devices (not shown) which may be located on the implement 19. Auto mode switch 30 is preferably a multi-position switch which the operator can manipulate to select different desired maximum engine speed when the tractor is operating under light load conditions. For example, switch 30 may be used to select mode 1=fuel economy off, mode 2=1500–1800 rpm, or mode 3=1200–1500 rpm. Paddle pots 20 and lever 26 are movable fore-and-aft to plus and minus positions on opposite sides of a center or neutral position to extend or retract a corresponding hydraulic function or hitch cylinder 38. A paddle pot or SCV lever is described in detail in U.S. Pat. No. 5,343,775, issued in 1994 and assigned to the assignee of this application.

Hydraulic controller 32 provides control signals to selective control valves (SCV) 24A–24F and to hitch valve 34. Controller 32 is preferably capable of executing implement management system (IMS) algorithms, such as described in U.S. Pat. No. 6,292,729, and preferably transmits IMS signals to controller 18. Hitch valve 34 controls a hitch cylinder 38 which raises and lowers an implement hitch 39 to which an implement 41 is attached. The controllers 14, 16, 18, 32 and interface 17 are preferably connected to each other by a conventional CAN bus. In response to the signals it receives, controller 18 generates and provides control signals to the hydraulic controller 32.

An engine speed sensor 40 provides an engine speed signal ES to controller 14. A wheel speed sensor 42 provided a wheel speed or vehicle speed signal WS to controller 16. The auto mode switch 30 provides selected desired engine speed signals to controller 18 for use when in a low engine speed mode. The system hardware components described so far are similar to those found on commercial 7810 Series John Deere tractors with an IVT.

Figure 2:
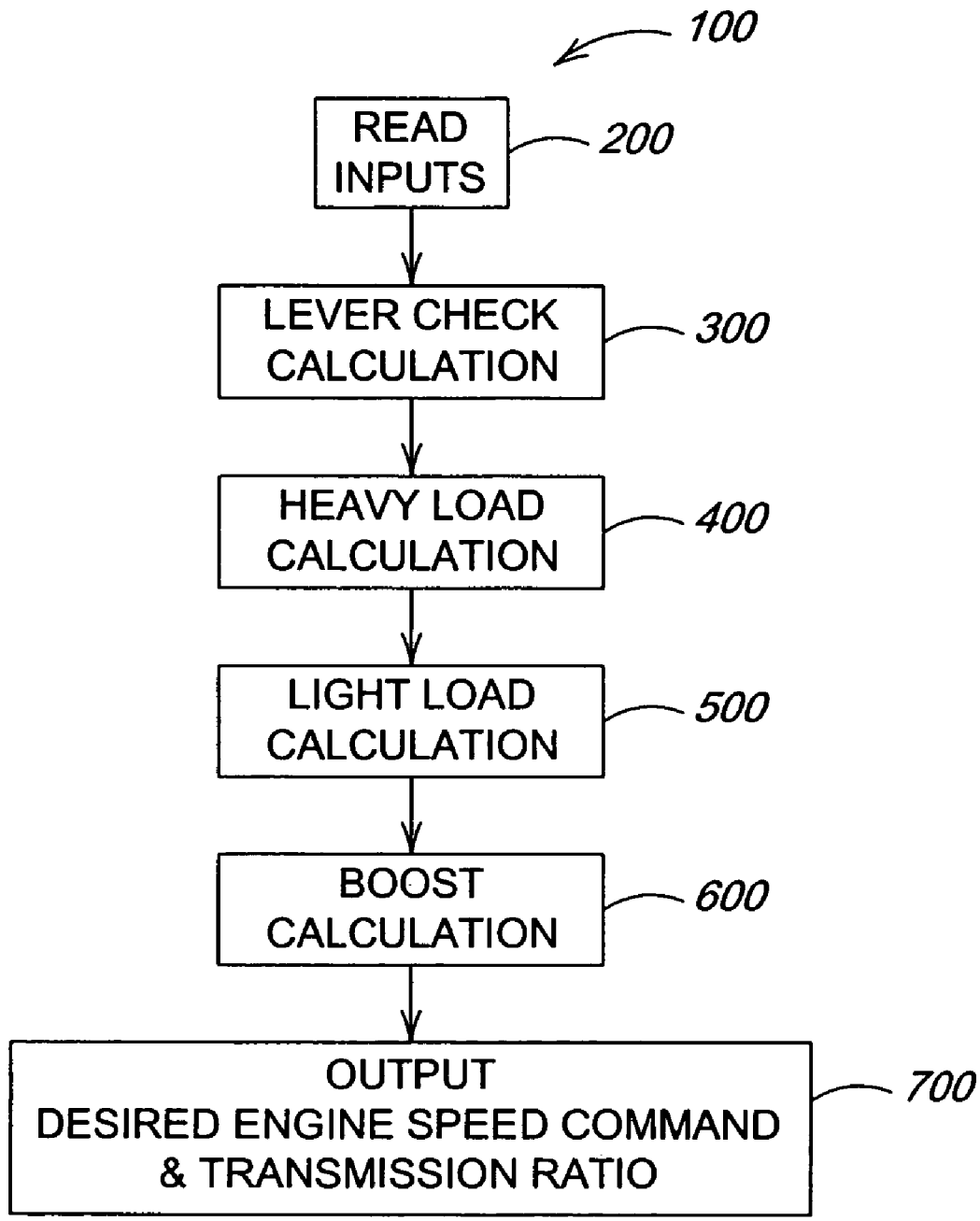
FIG. 2 is a simplified overall logic flow diagram illustrating an algorithm executed by the ECU of FIG. 1.

The controller 14 provides engine speed signal ES and an engine load signal L to auxiliary controller 18, and controller 16 provides wheel speed signal WS to controller 18. Controller 18 executes an algorithm 100 and generates a Desired Engine Speed Command and a Transmission Ratio Command in response to the signals it receives. This algorithm 100 is executed periodically, such as 50 times per second, and is illustrated by the flow chart of FIG. 2. Algorithm 100 sequentially executes a read CAN messages step 200, a lever check subroutine 300, a heavy load control calculation subroutine 400, a light load calculation subroutine 500, a boost calculation subroutine 600. At step 700, the controller 18 transmits a Desired Engine Speed Command over the CAN bus to the engine controller 14, and transmits a Transmission Ratio Command over the CAN bus to the transmission controller 16.

In step 200, the controller 18 reads and stores a plurality of input signals. It reads the vehicle speed from sensor 42, engine speed from sensor 40, engine load from controller 14, commands from SCV control devices 20A–20D and the joystick 22, hitch command from sensor 28, IMS commands from controller 32, control valve commands from interface 17, requests for increased hydraulic flow from implement 19 via the interface 17 and requests for increased engine speed from implement 19 via interface 17.

Figure 3:
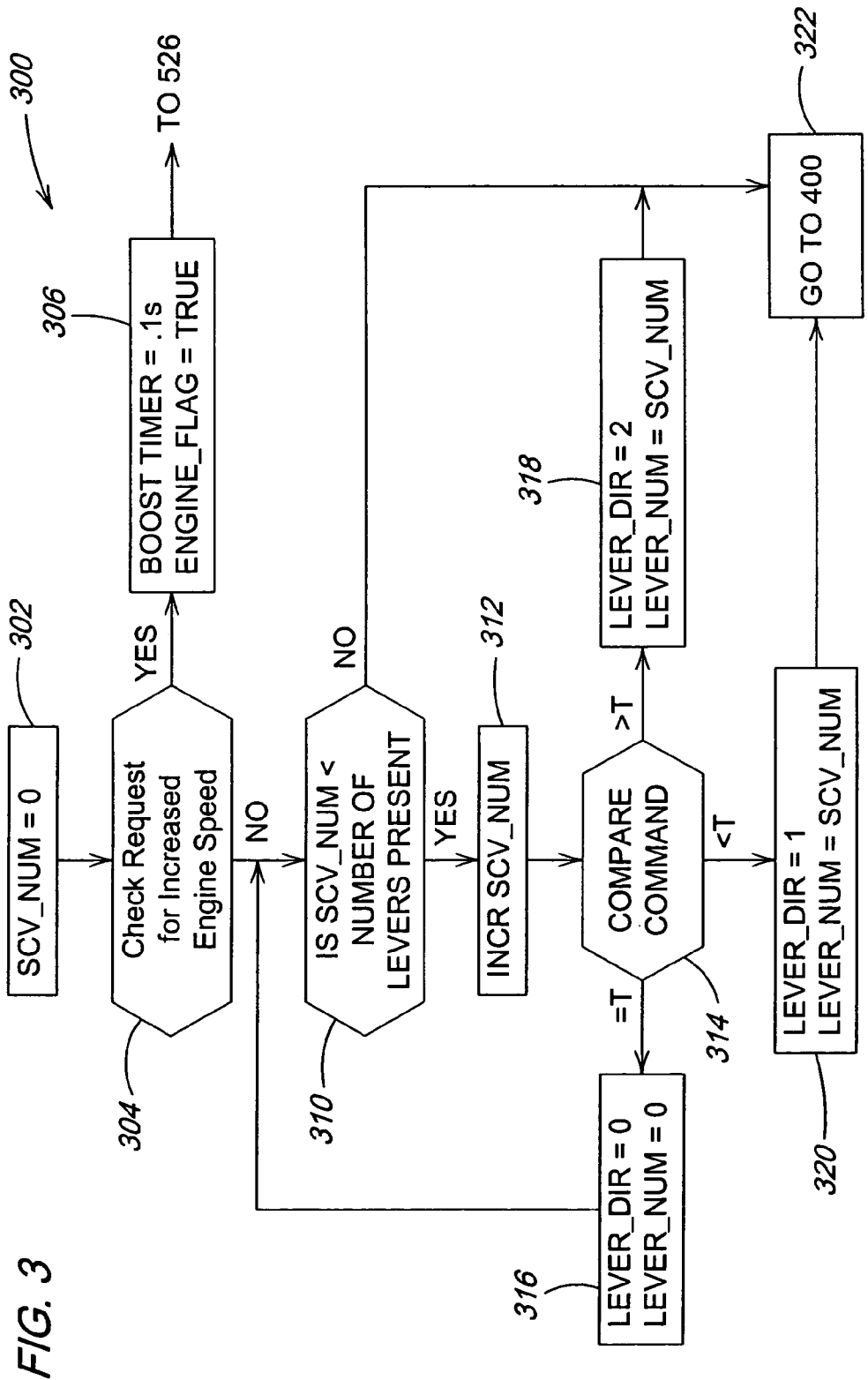
FIG. 3 is a logic flow diagram of the lever check subroutine portion of FIG. 2.

Referring now to FIG. 3 and lever check subroutine 300, step 302 sets an SCV_NUM index value to zero.

If a request for increased engine speed has been received via interface 17, step 304 directs the subroutine to step 306, else to step 308. Step 306 sets a BOOST TIMER value to 0.1 seconds and sets an ENGINE_FLAG=true, and directs the subroutine to step 526 of subroutine 500.

Step 310 compares SCV_NUM to the total number of input control devices. If SCV_NUM is not less than the total number, step 310 directs the subroutine to step 322 which directs control to subroutine 400. If CV_NUM is less than the total number, step 310 directs the subroutine to step 312 which increments SCV_NUM.

Step 314 compares the command value for the control device corresponding to the current SCV_NUM value to a threshold, T, representing a neutral or center control device position. If the command value equals T (representing a neutral or center control device position), step 314 directs the subroutine to step 316 which sets a control device direction value (LEVER_DIR) equal to zero, sets an control device number value (LEVER_NUM) equal to zero, and then returns control to step 310.

If the command value is greater than T (the control device is in a plus position), step 314 directs the subroutine to step 318 which sets a control device direction value (LEVER_DIR) equal to 2, sets the control device number value (LEVER_NUM) equal to SCV_NUM, and directs control to step 322. If the command value is less than T (the control device is in a minus position), step 314 directs the subroutine to step 320 which sets a control device direction value (LEVER_DIR) equal to 1, sets LEVER_NUM equal to SCV_NUM, and then returns control to step 322. Step 322 directs control to subroutine 400.

To summarize, the lever check subroutine 300 first checks if an implement function is demanding an increased engine speed. If an implement function requests an increased engine speed, then the subroutine sets the BOOST TIMER and ENGINE FLAG. This will cause control to skip the heavy load subroutine 400 and jump to the light load subroutine 500 (to the step where the BOOST TIMER is checked).

Otherwise, the subroutine 300 checks for commands indicating a displacement of each of the hydraulic control devices, including the SCV levers 20, joystick 22, hitch lever 26, or a control device which would cause interface 17 to transmit a valve command to controller 18. If one of these commands indicates a non-centered control device position, the subroutine stores the LEVER_DIR (direction of displacement) and LEVER_NUM (the identity of the displaced control device), and then directs control to subroutine 400. If no command indicates a displaced or non-centered control device, control passes to subroutine 400.

Figure 4:
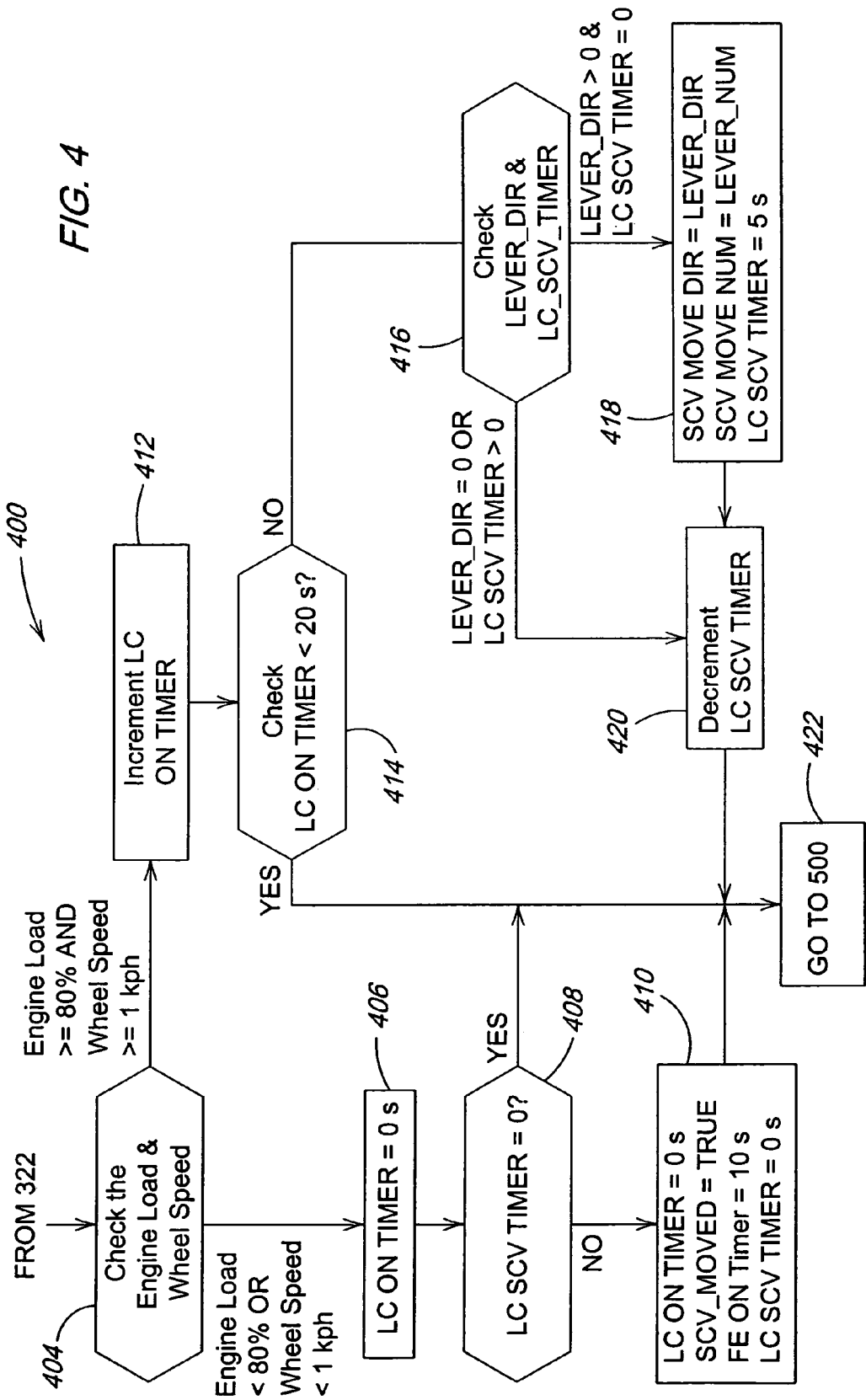
FIG. 4 is a logic flow diagram of the heavy load calculation subroutine portion of FIG. 2.

Turning now to FIG. 4 and the heavy load control calculation subroutine 400, step 404 compares the engine load L and the wheel speed WS to certain values. Step 404 directs the subroutine to step 412 if the engine load is greater than or equal to 80% of a maximum load value and WS is greater than or equal to 1 kph. Step 404 directs the subroutine to step 406 if the engine load is less than 80% of maximum or WS is less than or equal to 1 kph.

Step 406 sets a load control on timer value (LC ON TIMER)=0.

Step 408 checks the status of a load control SCV timer value (LC SCV TIMER). If LC SCV TIMER=0, step 408 directs the subroutine to step 422. If LC SCV TIMER>0, step 408 directs the subroutine to step 410.

Step 410 sets the LC ON TIMER to 0, sets a SCV_MOVED flag=true, sets a FE ON TIMER value=10 seconds, sets the LC SCV TIMER=0 seconds, and directs the subroutine to step 422.

Returning to step 412, step 412 increments the LC ON TIMER, after which step 414 checks the status of the LC ON TIMER. If LC ON TIMER>=20 seconds, step 414 directs the subroutine to step 416. If LC ON TIMER<20 seconds, step 414 directs the subroutine to step 422.

Step 416 checks the status of LEVER_DIR and LC_SCV_TIMER. If LEVER_DIR>0 and LC_SCV_TIMER=0, step 416 directs the subroutine to step 418. If LEVER_DIR=0 or LC_SCV_TIMER>0, step 416 directs the subroutine to step 420. Step 418 sets SCV MOVE DIR to LEVER_DIR, sets SCV MOVE NUM=LVER_NUM, sets LC SCV TIMER=5 seconds and directs the subroutine to step 420.

Step 420 decrements the LC SCV TIMER and directs the subroutine to step 422. Step 422 directs control to subroutine 500.

To summarize, the heavy load control calculation subroutine 400 checks whether the tractor is moving at a minimum speed (1 kph) and whether the engine is being heavily loaded (over 80% maximum engine load). If the tractor is heavily loaded and is moving at or faster than the minimum speed for less than 20 seconds, the algorithm proceeds to the subroutine 500.

If the tractor has been under heavy load and is moving faster than 1 kph for 20 seconds and a control device is displaced, then the identity of that control device (SCV MOVE NUM) and its direction of displacement from its centered or neutral position (SCV MOVE DIR) is stored. If the engine load drops or the tractor slows below 1 kph within a short amount of time (5 seconds) after the control device has been displaced, then the SCV_MOVED flag is set equal to true to indicate that the stored control device caused that decrease in the engine load.

Turning to FIG. 5 and light load calculation subroutine 500, step 504 checks the operational status of the Fuel Economy mode as represented by a Fuel Economy Mode flag. This flag is initially false (the first time the algorithm is executed), and is then set true or false at steps 536 & 538. If the Fuel Economy mode is not on, the subroutine proceeds to step 508 which sets an RPM Setting value=minimum engine speed, and then to step 540 which sets Transmission ratio=desired wheel speed÷rpm setting, and then directs the algorithm to subroutine 600. If the Fuel Economy mode is on, the subroutine proceeds to step 506 which sets the LC ON TIMER=0 seconds.

Next, step 510 checks the FE ON TIMER. If FE ON TIMER>0 seconds, step 512 decrements the FE ON TIMER and directs the subroutine to step 520. If FE ON TIMER=0 seconds, step 510 directs the subroutine to step 514.

Step 514 checks the SCV_MOVED flag. If the SCV_MOVED flag is false, step 514 directs the subroutine to step 520, else to step 516.

Step 516 whether the stored LEVER_DIR is opposite of the SCV MOVE DIR, whether SCV MOVE NUM=LEVER_NUM, whether WS>=1 kph, and whether Boost Timer=0. If these conditions are all true, the subroutine proceeds to step 518, else to step 520.

Step 518 sets the SCV_MOVED flag=false, resets SCV MOVE DIR, resets SCV MOVE NUM, sets the Boost Timer=3 seconds and directs the subroutine to step 520.

Step 520 checks the Boost Timer. If the Boost Timer=0 seconds, step 520 directs the subroutine to step 522 which sets RPM Setting=minimum engine speed, and then returns at step 534. If the Boost Timer>0 seconds, step 520 directs the subroutine to step 524 which decrements the Boost Timer and directs the subroutine to step 526.

Step 526 checks the status of Auto Mode switch 30. If the Auto Mode Setting=Mode 2 then step 528 sets the RPM Setting to Boost 1, such as 1500 rpm. If the Auto Mode Setting is other than mode 2 or 3, then step 530 sets the RPM Setting to a maximum engine speed value. If the Auto Mode Setting=Mode 3 then step 532 sets the RPM Setting to Boost 2, such as 1800.

Following steps 528, 530 and 532, step 534 checks the engine load and RPM Setting value. If engine load is <80% of what maximum fuel consumption and RPM Setting>a minimum engine speed, then step 536 sets the Fuel Economy flag=true. If engine load is >80% or RPM Setting<a minimum engine speed, then step 538 sets the Fuel Economy flag=false.

Step 540 then sets Transmission Ratio=desired wheel speed÷RPM Setting, sets Desired Engine Speed Command=RPM Setting, and then directs the algorithm to step 600.

To summarize, the light load subroutine 500 operates when the vehicle is under light load. If the SCV_MOVED flag is true, and the stored control device is subsequently moved in the opposite direction to the stored direction, then steps 516 and 518 of subroutine 500 will operate to cause an immediate 3 second engine speed boost, even before the engine would otherwise detect the increased load which would eventually result from such input displacement. subroutine 500 also determines an engine rpm setting value as a function of the setting of the auto mode switch 30. Subroutine 500 also determines a transmission ratio value as a function of a desired wheel speed and the engine rpm setting value, and sets an engine speed command value equal to the rpm setting value.

Turning to FIG. 6 and boost calculation subroutine 600, step 602 checks the Boost Timer and the engine speed ES. If Boost Timer>0 and ES>=(Desired Engine Speed Command−30 rpm), then step 604 sets a Lugdown Timer=5 seconds and directs the subroutine to step 606. If Boost Timer=0 or ES<(Desired Engine Speed Command−30 rpm), then step 602 directs the subroutine to step 606.

Step 606 checks the Boost Timer and the Lugdown Timer. If Boost Timer=0 and the Lugdown Timer>0, then step 606 directs control to step 608.

Step 608 decrements the Lugdown Timer and directs control to step 610.

Step 610 checks the engine speed ES. If ES>=a Low Allowable Engine Speed value, then step 624 returns control to the main loop 100. If ES<the Low Allowable Engine Speed value, then step 612 sets an Engine Dropped Low flag=true, and sets a New Boost value=ES−Low Allowable Engine Speed value, after which subroutine 660 ends at step 624.

Returning to step 606, if Boost Timer>0 or the Lugdown Timer=0, then step 606 directs control to step 614. Step 614 checks the Engine Dropped Low flag. If the Engine Dropped Low flag=false, and the subroutine ends at step 624. If the Engine Dropped Low flag=true, then step 614 directs the subroutine to step 616.

Step 616 checks the Auto Mode Setting. If Auto Mode Setting=Mode 2, then step 616 directs the subroutine to step 618. If Auto Mode Setting=Mode 3, then step 616 directs the subroutine to step 622. If Auto Mode Setting=any setting other than Mode 2 or 3, then step 616 directs the subroutine to step 620.

Step 618 sets Boost 1=Boost 1+New Boost, sets New Boost=0 and sets Engine Dropped Low=False and directs control to step 624. Step 620 sets New Boost=0 and sets Engine Dropped Low=False and directs control to step 624. Step 622 sets Boost 2=Boost 2+New Boost, sets New Boost=0 and sets Engine Dropped Low=False and directs control to step 624.

To summarize, the boost calculation subroutine 600, determines, when an engine boost is commanded, whether or not the boost commanded is large enough to stop bad performance (such as engine stalling). Subroutine 600 monitors the actual engine rpm after a boost is commanded, and if the actual engine rpm drops too low, then subroutine 600 increases the boost so that the next time a boost is commanded the actual engine rpm will not drop too low.

Finally, referring again to FIG. 2, subroutine 700 causes the controller 18 to transmit the Desired Engine Speed Command (from step 540 of subroutine 500) to the engine controller 14, and to transmit the Transmission Ratio command (also from step 540) to the transmission controller 16. The engine controller 14 increases the engine speed if commanded by the Desired Engine Speed Command, and the transmission controller 16 controls the transmission ratio of the transmission 12 in response to the Transmission Ratio command.

As a result, the engine and transmission control system reacts to a control device operation (such as commanding an implement to engage the ground) which will increase engine load, before the engine actually begins to be affected by the load increase. To do this, the control system monitors manipulation of manual control devices and learns which control device manipulations previously caused a decreased engine load. When the same control device is then manipulated in the opposite direction, the control system will temporarily boost or raise engine RPM and decrease the transmission ratio in anticipation of the expected load. The drop in transmission ratio will result in a constant wheel speed. After the control system has boosted the engine rpm, it will monitor whether or not the engine speed was boosted high enough to prevent the engine speed from dropping below a threshold. If the engine speed drops below the threshold, then the control system will increase the amount of engine speed boost to be applied the next time that function control is manipulated.

The conversion of the above flow charts into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. For example, the invention is applicable to a system having any sort of operator manipulated control devices, such as levers, knobs, switches, buttons, etc. Accordingly, this invention is intended to embrace all such alternatives, modifications and variations which fall within the spirit and scope of the appended claims.

What is claimed is:

1. In a vehicle having an engine driving wheels through a transmission, a plurality of engine powered auxiliary functions, the operation of each auxiliary function being controlled by a corresponding manually operated control device, a method of controlling the engine comprising:
   monitoring engine load;
   monitoring displacement of the control devices;
   in response to displacement of one of the control devices and in response to a decrease in engine load, storing an identity and displacement direction of said displaced control device; and
   in response to displacement of the stored identity control device in a direction opposite to the stored displacement direction, temporarily boosting the engine speed before operation of the corresponding auxiliary function can effect load on the engine.

2. The method of claim 1, further comprising:
   in response to displacement of the stored identity control device in a direction opposite to the stored displacement direction, temporarily decreasing a transmission ratio of the transmission.

3. The method of claim 1, further comprising:
   monitoring the engine speed; and
   after the engine speed has been boosted, if the engine speed drops below a threshold, increasing the amount by which the engine speed is boosted when the stored identity control device is later displaced in the direction opposite to the stored displacement direction.

4. The method of claim 1, further comprising:
   varying the amount by which the engine speed is boosted as a function of a status of an operator controlled mode control device.

* * * * *